United States Patent [19]

Eichner et al.

[11] Patent Number: 4,479,577
[45] Date of Patent: Oct. 30, 1984

[54] PIVOTAL FILING CONTAINER FOR MAGNETIC DISKS

[75] Inventors: Falk J. Eichner, Coburg, Fed. Rep. of Germany; Douglas S. Ramsdale, Palatine, Ill.; Jean Bourbon, Saint Lupicin, France

[73] Assignee: Fellowes Manufacturing Co., Eichner Systems Division, Itasca, Ill.

[21] Appl. No.: 547,100

[22] Filed: Oct. 31, 1983

[51] Int. Cl.³ .................... B65D 85/57; B65D 1/24; B65D 43/24; A47B 63/00
[52] U.S. Cl. .................. 206/45.18; 206/425; 206/444; 206/472; 206/809; 220/23; 229/1.5 R
[58] Field of Search ............. 206/45.18, 444, 425, 206/809, 472; 220/23; 229/1.5 R

[56] References Cited

U.S. PATENT DOCUMENTS

| | | | |
|---|---|---|---|
| 1,173,388 | 2/1916 | Rosenberg | 206/45.18 |
| 2,201,547 | 5/1940 | Scheinman | 206/425 |
| 3,924,742 | 12/1975 | Primicerio et al. | 206/809 |
| 4,325,595 | 4/1982 | Solomon | 206/45.18 |
| 4,369,879 | 1/1983 | Egly et al. | 206/425 |

Primary Examiner—William T. Dixson, Jr.
Attorney, Agent, or Firm—Dressler, Goldsmith, Shore, Sutker & Milnamow, Ltd.

[57] ABSTRACT

A pivotal filing container is disclosed for storage and filing of magnetic computer disks or like generally flat articles. The container construction includes a generally rectangular outer support portion, and a relatively pivotal inner file portion which is pivotal between open and closed positions with respect to the outer support portion. In the preferred form, the inner file portion can be opened to a tray-like V-configuration when disposed in its open position, thus facilitating convenient review and inspection of magnetic disks stored within the file portion. To further facilitate convenient use, an indexing mechanism is provided to prevent unrestrained pivotal movement of the inner file portion to its open position after it has been moved from its fully closed position.

14 Claims, 7 Drawing Figures

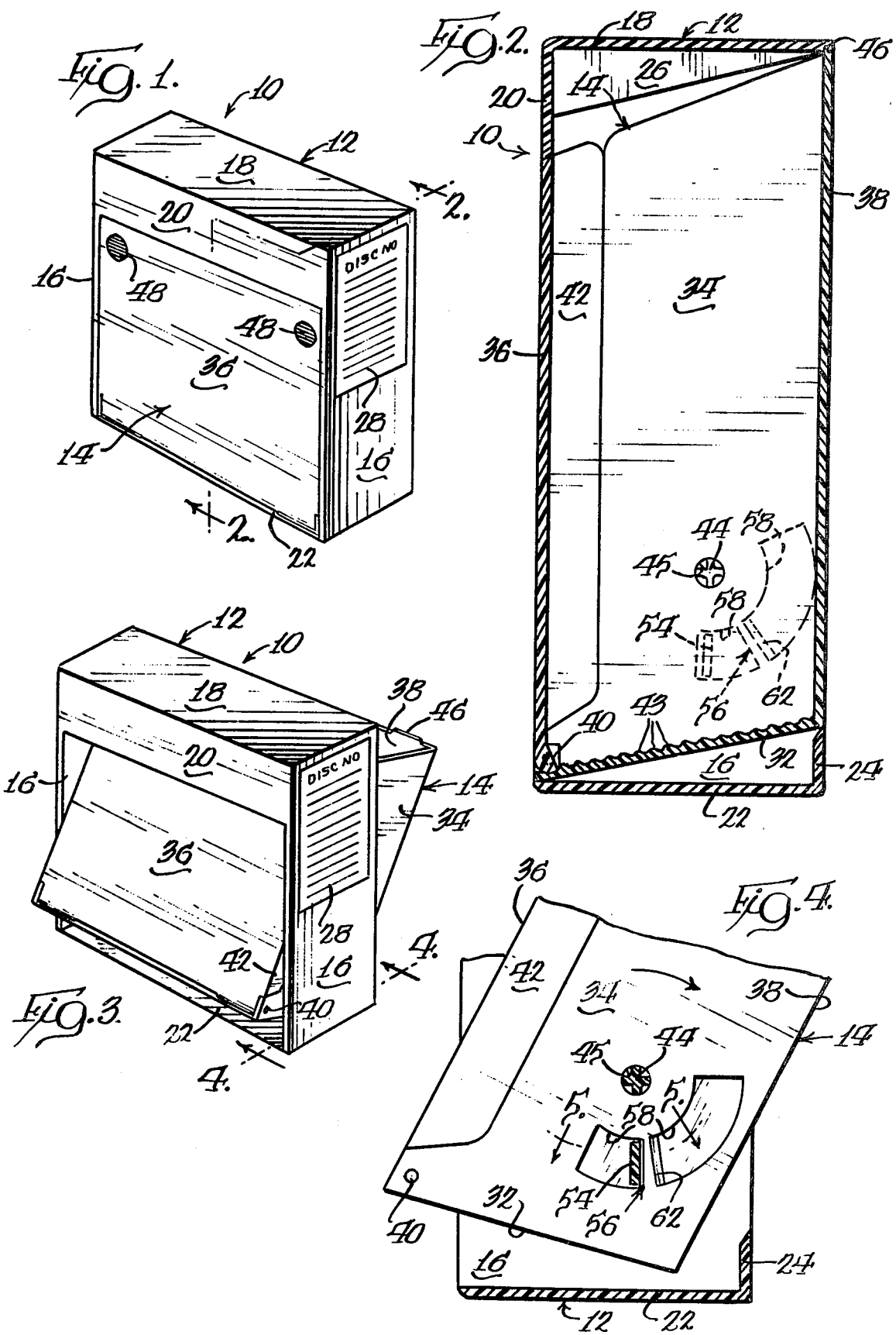

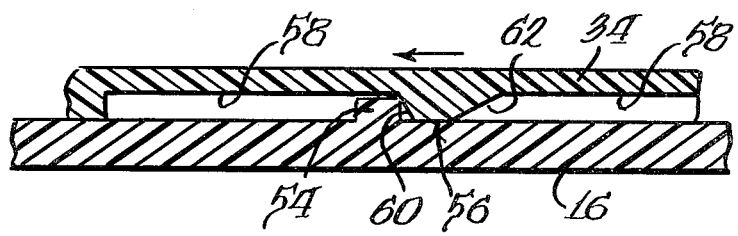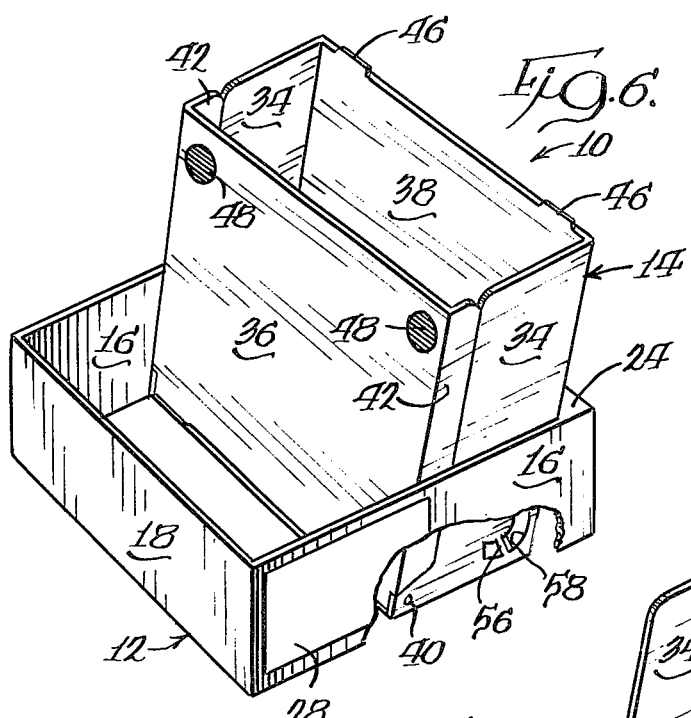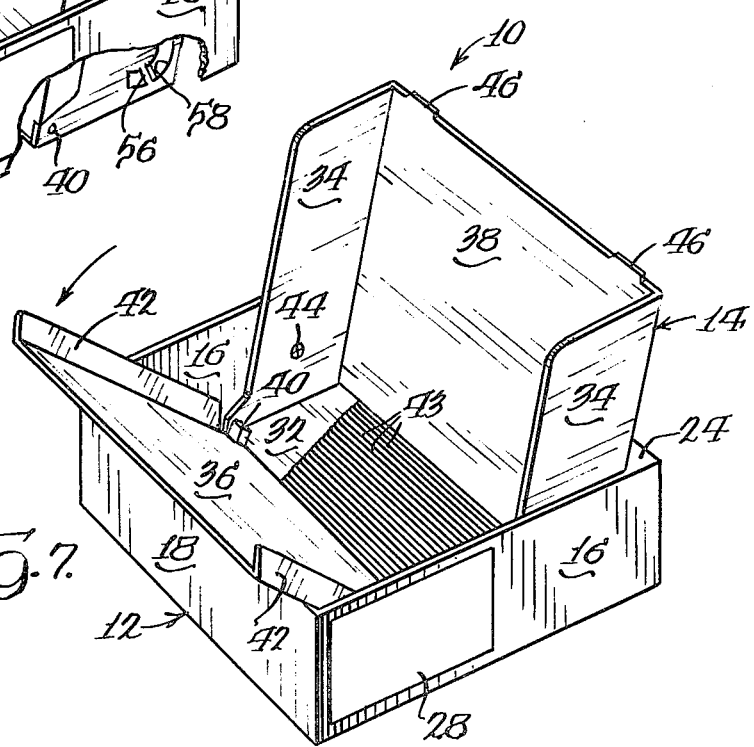

PIVOTAL FILING CONTAINER FOR MAGNETIC DISKS

TECHNICAL FIELD

The present invention relates generally to storage and filing container constructions, and more particularly to a filing container having a pivotal inner file portion for holding generally flat objects such as information-carrying magnetic disks.

BACKGROUND OF THE INVENTION

The advent of the widespread use of computers has created a need for efficient filing and storage systems for information-carrying magnetic disks. Magnetic disks of this nature are available in various sizes, and are employed for magnetic storage of information, including computer software. A computer system employing magnetic disks includes a so-called disk-drive for storage and retrieval of information on the disks.

Because all magnetic disks have limited information storage capacity, any one computer system may require use of a large number of different disks for optimizing the efficiency of the system. In view of this, the use of devices for efficiently filing and storing the magnetic disks is very desirable. Not only should such devices facilitate convenient and organized filing of the magnetic disks, but must also be designed to protect the disks from damage and debris which could otherwise interfere with their correct operation.

One type of previously known disk filing container is an adaptation of a filing device which in the past has been used for storage of index cards and the like. This container construction includes a generally rectangular outer enclosure, and an inner file holder which is pivotal with respect to the outer enclosure. The inner file holder is movable from a position wherein it is substantially nested within the outer enclosure to a position wherein it extends from the outer enclosure for access to the contents of the file holder. Some forms of this previous construction have included an inner file holder which can be opened to a tray-like configuration to facilitate access to the contents thereof.

One problem that has been encountered with the use of the above-described container construction is the relative freedom with which the inner file holder can pivot with respect to the outer enclosure. In some instances, the unrestrained relative pivotal movement of the inner file holder can result in the holder inadvertently moving to its fully open position after just slight movement from the position wherein it is nested within the outer enclosure. The inadvertent movement of the inner file holder to its open position can undesirably result in the contents of the container being spilled, which at best is inconvenient, and at worst may result in damage to the contents, particularly in the case of magnetic disks which must be handled with relative care.

Accordingly, it is very desirable to provide a filing container for holding generally flat objects such as magnetic disks which overcomes the disadvantages associated with previous filing container constructions.

SUMMARY OF THE INVENTION

In accordance with the present invention, a filing container is disclosed which is particularly adapted for filing and storage of magnetic computer disks. The container includes a generally rectangular outer support portion which acts as an enclosure for a relatively pivotal inner file portion. The inner file portion is movable between closed and open positions with respect to the outer support portion such that in the open position, the inner file portion is disposed in generally upstanding relation to the outer support portion for gaining access to the magnetic disks or like objects held within the inner file portion. Significantly, the container construction includes an indexing mechanism which prevents unrestrained pivotal movement of the inner filing portion toward its open position after it has been moved from its closed position.

The generally rectangular outer support portion of the present filing container includes a pair of laterally spaced sidewalls, and a front wall extending between respective ends of the sidewalls. In the preferred form, the outer support portion further includes a rear wall extending between the sidewalls thereof, with the rear wall including a stop portion engageable by the inner file portion of the construction when the inner file portion is in its open position.

The inner file portion of the present container is disposed generally within the outer support portion, and has an open-ended configuration for receiving articles such as magnetic disks therein. The inner file portion includes an end wall, a pair of laterally spaced sidewalls, and spaced front and rear walls extending between the file portion sidewalls. In the preferred embodiment of the present invention, the inner file portion includes pivot means whereby the front wall thereof is pivotal toward and away from the rear wall thereof when the inner file portion is in its open position, thus providing the inner file portion with a V-like configuration in its open position for facilitating access to the magnetic disks stored therein.

Relative pivotal movement of the inner file portion and the outer support portion is provided by pivot means which pivotally connect each of the inner file portion sidewalls to a respective one of the outer portion sidewalls. By this construction, the inner file portion is relatively pivotal with respect to the outer support portion about a transversely extending pivot axis through an arc of preferably more than 90 degrees but less than 180 degrees. In this way, the inner file portion is movable from its closed position wherein it is disposed generally between the outer portion sidewalls and is nested within the outer support portion, to an open position wherein the inner file portion is disposed in generally upstanding relation to the outer support portion for access to the contents of the container.

As noted, the present filing container construction includes an indexing mechanism for preventing unrestrained relative pivotal movement of the inner file portion to its open position after the file portion has been relatively moved from its closed position. In the illustrated embodiment, the indexing mechanism comprises first and second coacting indexing projections, with one of the projections being disposed on the inside surface of at least one of the outer portion sidewalls, with the other of the projections being disposed on the outside surface of the one of the inner file portion sidewalls generally adjacent said one of the outer portion sidewalls.

In the preferred form, the one of the sidewalls on which the second indexing projection is disposed defines an arcuate recess extending radially about the pivotal axis of the inner file portion. The second indexing projection is positioned generally within the arcuate recess so that the first indexing projection is relatively movable within the arcuate recess during pivotal movement of the inner file portion. By this construction, the indexing projections are adapted for releasable coacting engagement with each other for restraining relative pivotal movement of the inner file portion to its open position after movement thereof from its closed position. Cam means are preferably provided in association with one of the indexing projections, the cam means being engageable by the other of the projections during relative pivotal movement of the inner file portion from its open to its closed position. In this manner, movement of the inner file portion from its open to its closed position is relatively unrestrained by engagement of the first and second indexing projections with each other.

Other features of the present construction particularly facilitate its convenient use for storage and filing of magnetic disks and like articles. In the illustrated embodiment, the end wall of the inner file portion is disposed at an angle with respect to the rear wall of the inner file portion, this angle being equal to the arc of relative pivotal movement of the inner file portion. In conjunction with the preferred positioning of the means pivotally connecting the inner file and outer support portions, this construction positions the end wall of the inner file portion in aligned and flush relation with respective ones of the edges of the outer portion sidewalls in the open position of the file portion, with the file portion extending in upstanding relation beyond the respective opposite ones of the edges of the outer portion sidewalls. Thus, the inner file portion can be easily moved to its open position, and the entire filing container then supported by the outer support portion as well as by the end wall of the inner file portion.

Convenient and protective storage of magnetic disks in the present filing container is further facilitated by the provision of one or more inwardly projecting webs which project integrally inwardly of the front wall of the outer support portion. The webs are positioned such that the open end of the inner file portion is disposed in generally confronting relation with the webs when the file portion is in its closed position, thus preventing disks or the like from moving from within the inner file portion should the container be jostled or disturbed.

Numerous other features and advantages of the present invention will become readily apparent from the following detailed description, the accompanying drawings, and the appended claims.

BRIEF DESCRIPTION OF THE DRAWINGS

FIG. 1 is a perspective view illustrating a filing container embodying the principles of the present invention in a closed condition, and positioned on-end, such as for storage;

FIG. 2 is a cross-sectional view of the present filing container taken generally along the lines 2—2 of FIG. 1;

FIG. 3 is a further perspective view of the present filing container illustrating the container in its opened, indexed position;

FIG. 4 is a fragmentary, cross-sectional view taken generally along lines 4—4 of FIG. 3;

FIG. 5 is an enlarged cross-sectional view of the indexing mechanism of the present filing container taken generally along an arc defined by lines 5—5 in FIG. 4;

FIG. 6 is a perspective view of the present filing container in its open condition prior to opening of the inner file portion of the container; and FIG. 7 is a perspective view similar to FIG. 6 further illustrating the present filing container in its open condition, and illustrating the inner file portion of the container in an open position.

DETAILED DESCRIPTION

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

For purposes of the present disclosure, terms such as upper and lower, front and rear, and like terms of orientation are used with reference to the accompanying drawings which illustrate the present filing container in typical orientations for storage and use. It will be understood, however, that such terms of orientation shall not be construed as suggesting that a filing container embodying the principles of the present invention could not be used in orientations other than illustrated.

With reference now to FIGS. 1 to 3, therein is illustrated a pivotal filing container 10 embodying the principles of the present invention. As noted, the present filing container is particularly suited for storage and filing of generally flat objects, with its specifically contemplated use being the storage and filing of information-carrying magnetic computer disks (sometimes referred to as diskettes). Magnetic disks of this nature are presently available in a number of different sizes, and accordingly container 10 is preferably appropriately sized for holding a number of magnetic disks of a particular size. Naturally, the present filing container can be used for storage and filing of like generally flat objects, with the protection afforded articles positioned within the container particularly suiting the container for use in storing magnetic disks or other articles which must be handled with a fair degree of care.

As will be further described, the present filing container 10 is pivotal in the sense that it includes a generally rectangular outer support portion, generally designated 12, and an inner file portion, generally designated 14, which is generally nestable within and pivotal with respect to the outer support portion 12. By this configuration, the open-ended inner file portion 14 is movable from a closed position, illustrated in FIG. 1, to a fully open position illustrated in FIGS. 6 and 7, for access to articles disposed within inner file portion 14.

Outer support portion 12 is preferably of one-piece, unitary construction, and is preferably fabricated from plastic material exhibiting suitable durability, as well as some resilient flexibility. The support portion 12 includes a pair of laterally spaced sidewalls 16, and a front wall 18 extending between respective ends of sidewalls 16. As shown in FIG. 1, front wall 18 is disposed at the top of container 10 when the container is positioned on end as in FIG. 1 for storage. As illustrated in the drawings, inner file portion 14 is disposed generally between and in alignment with outer portion sidewalls 16 in the closed position of the file portion, with the file portion generally nested within and enclosed by outer support portion 12.

Outer support portion 12 further includes a partial wall 20 extending between sidewalls 16 and connected to front wall 18 for further enclosing inner file portion 14. The outer support portion 12 also preferably includes a rear wall 22 spaced from front wall 18 and extending between respective ends of sidewalls 16 opposite from front wall 18. Rear wall 22 preferably includes a stop portion 24 associated with sidewalls 16, the stop portion 24 being engageable by inner file portion 14 in the open position thereof for limiting opening pivotal movement of the inner file portion to an arc of less than 180 degrees. As will be observed, rear wall 22 of outer support portion 12 is configured to support filing container 10 when the filing container is disposed in its closed condition, and is positioned on-end such as for storage.

Other preferred features of outer support portion 12 facilitate its use for storage and filing of magnetic disks. As shown in FIG. 2, the outer support portion includes at least one, and preferably a pair of laterally spaced inwardly projecting webs 26 extending integrally inwardly from front wall 18 (with one web 26 being shown). Webs 26 are configured for disposition in confronting relation with the open end of inner file portion 14, thus acting to prevent the movement of articles from within file portion 14 when it is disposed in its closed position. By this arrangement, magnetic disks or other articles held within file portion 14 are prevented from moving excessively should the filing container be jostled or otherwise disturbed, thus desirably protecting the articles therein.

If desired, outer support portion 12 can be provided with a suitable label such as 28, preferably disposed on one of sidewalls 16. The contents of the container can be conveniently noted on the label 28, and the filing container thus positioned on a shelf or the like for storage so that the contents therein can be easily ascertained from the label.

The preferred construction of inner file portion 14 will now be described in detail. As noted, file portion 14 has a generally open-ended configuration, and accordingly includes an end wall 32, a pair of laterally spaced sidewalls 34 extending from the end wall, and spaced front and rear walls 36 and 38 extending between the sidewalls 34. As best shown in FIGS. 1 and 2, front wall 36 and rear wall 38 are respectively aligned and flush with partial wall 20 and stop portion 24 of outer support portion 12 when file portion 14 is in its closed and nested position, with walls 36 and 38 thus providing container 10 with a box-like configuration in this closed position, and with the container fully enclosing articles therein.

In the preferred form, means are provided for pivotally connecting front wall 36 with the remainder of file portion 14, and to this end a pair of pivotal connections 40 are provided such that front wall 36 is movable toward and away from rear wall 38 when the inner file portion 14 is in its open position. This action is best illustrated in FIGS. 6 and 7 wherein inner file portion 14 is illustrated in its open position, with the file portion disposed in generally upstanding relation to outer support portion 12. As will be evident from FIG. 7, the pivotal nature of front wall 36 permits the inner file portion to be opened to a V-like configuration, thus facilitating convenient review of disks or like articles therein. Front wall 36 preferably includes side wings 42 at opposite edges thereof which are complemental to sidewalls 34, thus providing the inner file portion 14 with a generally tray-like configuration for convenient review of articles therein.

As best illustrated in FIGS. 2 and 7, the inside surface of end wall 32 is preferably provided with a plurality of laterally extending ridges 43. Ridges 43 coact with magnetic disks or like articles positioned within file holder 14 in the nature of a file binder such that a group of magnetic disks in the container resist the tendency to "bunch-up" and crowd together, thus further facilitating convenient storage.

As noted, inner file portion 14 is adapted for pivotal movement with respect to outer support portion 12 between open and closed positions. To this end, pivotal connection means are provided for pivotally connecting each of inner portion sidewalls 34 with a respective one of outer portion sidewalls 16. In the illustrated embodiment, such pivotal connections are provided by a pair of pivot projections 44 respectively extending integrally inwardly from outer portion sidewalls 16. Each pivot projection 44 is received within a generally circular opening 45 defined by each of sidewalls 34 of inner file portion 14. Thus, pivot projections 44 define the pivot axis of inner file portion 14, with the generally X-shaped configuration of each pivot projection providing a smooth pivot action for the construction.

In order to releasably maintain inner file portion 14 in its closed position with respect to outer support portion 12, container 10 preferably includes releasable locking means for this purpose. In the illustrated embodiment, the releasable locking means comprise a pair of locking projections 46 which project from the upper edge of rear wall 38 of file portion 14, and which are adapted to be received within recesses defined by front wall 18 of outer support portion 12. Movement of the inner file portion 14 from its closed position is facilitated by the provision of thumb grips 48 defined by the outwardly facing surface of inner portion front wall 36. By this arrangement, the container can be easily grasped by its sides when in its closed position, and pressure exerted on thumb grips 48 to move inner file portion 14 from its closed position. It should be noted that in the closed condition, front wall 36 of inner portion 14 generally abuts partial wall 20 of outer portion 12, thus preventing the front wall 36 from pivoting away from the rear wall 38.

It will also be noted that the present container is preferably configured such that end wall 32 of inner file portion 14 is aligned and flush with respective edges of outer portion sidewalls 16 when the inner file portion is in its open position, with the inner file portion generally extending upwardly from the respective opposite edges of outer portion sidewalls 16 (see FIG. 6). To this end, the pivot axis defined by projections 44 is equally spaced from end wall 32 and front wall 36 of inner file portion 14, with end wall 32 disposed at an angle with respect to inner portion rear wall 38 which is equal to the arc of pivotal movement of the inner file portion. In the illustrated embodiment, this arc of pivotal movement is slightly more than 90 degrees, but less than 180 degrees, and thus end wall 32 is disposed at an obtuse angle with respect to rear wall 38. By this construction, inner file portion 14 can be moved to its open position as illustrated in FIG. 6, with the file portion supported by outer support portion 12 and the inner portion end wall 32. The inner file portion is thus maintained in its open position, thereby facilitating convenient review and inspection of articles within file portion 14.

As noted above, it is contemplated that the present disk filing container 10 normally be stored on-end as illustrated in FIG. 1, with the container being openable by pushing thumb grips 48 so that inner file portion 14 pivots towards its open position. However, it will be appreciated that unrestrained pivotal movement of inner file portion 14 toward its open position during opening of the container could result in inadvertent spilling of articles from the container as the inner file portion 14 moves to its open position under its own weight and the weight of the contents therein. Accordingly, the present filing container invention includes an indexing mechanism to prevent unrestrained pivotal movement of inner file portion 14 to its open position after it has been moved from its closed position and locking projections 46 released.

The indexing mechanism of the present container is best illustrated in FIGS. 2, and 4-6, and comprises first and second coacting indexing projections 54 and 56, with one of the projections provided on the inside surface of outer portion sidewall 16, and with the other of the projections disposed on the outside surface on the one of inner portion sidewalls 34 disposed adjacent to the one of the sidewalls 16 having the first indexing projection. Thus, in the illustrated embodiment first indexing projection 54 extends integrally inwardly from the inside surface of sidewall 16, with second indexing projection 56 defined by the outside surface of inner portion sidewall 34.

First and second indexing projections 54 and 56 are adapted for releasable engagement as inner file portion 14 is partially moved from its closed position towards its open position. Accordingly, the outer surface of inner portion sidewall 34 defines an arcuate recess 54 which extends radially about the pivot axis of the inner file portion, with second indexing projection 56 disposed generally within arcuate recess 58. Thus, as inner file portion 14 is pivoted relative to outer support portion 12, first indexing projection 54 is relatively movable within arcuate recess 58, with the first and second indexing projections 54 and 56 being mutually engageable during movement of the inner file portion between its open and closed positions.

To facilitate convenient use of the present container, the indexing mechanism thereof is configured to prevent unrestrained movement of inner file portion 14 to its open position, and to permit relatively unrestrained movement of the inner file portion from its open position to its closed position. To this end, the reactive, mutually abutting surfaces of first and second indexing projections 54 and 56 are configured to provide differential resistance to opening pivotal movement and closing pivotal movement of inner file portion 14.

As best illustrated in FIG. 5, second indexing projection 56 defines first and second cam surfaces 60 and 62 associated therewith for providing the desired differential indexing action. With the arrow in FIG. 5 illustrating the direction of relative movement of first and second indexing projections 54 and 56 during opening of inner file portion 14, it will be seen that first indexing projection 54 is adapted to engage and cam against first cam surface 60 during opening. The relatively steep slope of first cam surface 60 acts against first indexing projection 54 so as to resist unrestrained relative pivotal movement of the inner and outer portions of the container, thus releasably maintaining inner file portion 14 in its partially open position, as shown in FIG. 3. Movement of inner file portion from this partially open position to its fully open position is accommodated by the resilient flexibility of outer portion sidewall 16, which permits first indexing projection 54 to "ride-up" surface 60 and move past second projection 56 and back into arcuate recess 58. In this regard, it will be noted that the illustrated construction of the pivotal connection between inner file portion 14 and outer support portion 12, including pivot projection 44 disposed within pivot opening 45, permits outer portion sidewall 16 to flex and bow outwardly slightly to accommodate release of first and second indexing projections 54 and 56 from engagement with each other.

As will be recognized, the relatively less steep slope of second cam surface 62 permits relatively unrestrained pivotal movement of inner file portion 14 from its opened position to its closed position. Again, the resilient flexibility of outer portion sidewall 16 accommodates this releasable engagement of the first and second indexing projections 54 and 56, with the construction illustrated thus facilitating convenient closing of container 10 after use.

While a single indexing mechanism, including first and second indexing projections 54 and 56, has been thus far described, it is presently contemplated that such an indexing mechanism be provided generally at each of the lateral sides of container 10 at the interfaces of the respective outer portion sidewalls 16 and inner file portion sidewalls 34.

Thus, a filing container for magnetic disks or like articles is disclosed which facilitates convenient and safe storage of such magnetic disks. Disks or other articles held within the container are compactly stored by the construction of the present container, with review and inspection facilitated by opening of the inner file portion 14 to its V-like configuration.

From the foregoing it will be observed that numerous variations and modifications may be effected without departing from the true spirit and scope of the novel concept of the present invention. It will be understood that no limitations with respect to the specific article illustrated herein is intended or should be inferred. It is, of course, intended to cover by the appended claims all such modifications as fall within the scope of the claims.

What is claimed is:

1. A container for filing generally flat articles such as magnetic disks, comprising:
   an outer support portion having a pair of laterally spaced sidewalls, and a front wall extending between respective ends of said sidewalls;
   an inner file portion disposed generally within said outer support portion and configured to receive said articles, said inner file portion including an end wall, a pair of laterally spaced sidewalls extending from said end wall, and spaced front and rear walls extending between said file portion sidewalls;
   means pivotally connecting each of said inner file portion sidewalls to a respective one of said outer portion sidewalls, whereby said inner file portion is relatively pivotal about an axis with respect to said outer support portion from a closed position wherein said inner file portion is disposed generally between said outer portion sidewalls, to an open position wherein said inner file portion is disposed in generally upstanding relation to said outer support portion for permitting access to the articles in said file portion; and
   indexing means for preventing unrestrained relative pivotal movement of said inner file portion to said open position after said file portion has been relatively moved from said closed position.

2. A filing container in accordance with claim 1, including means pivotally connecting said front wall of said inner file portion to the remainder of said inner file portion, whereby said file portion front wall is pivotal toward and away from said file portion rear wall when said inner file portion is in said open position.

3. A filing container in accordance with claim 1, wherein said indexing means comprises first and second coacting indexing projections, one of said projections being disposed on the inside surface of one of said outer portion sidewalls, the other of said projections being disposed on the outside surface of the one of said inner portion sidewalls generally adjacent said one of said outer portion sidewalls, said indexing projections being adapted for releasable coacting engagement with each other for restraining relative pivotal movement of said inner file portion to said open position after movement thereof from said closed position.

4. A filing container in accordance with claim 3, wherein said one of said sidewalls on which said second indexing projection is disposed defines an arcuate recess extending radially about the pivotal axis of said inner file portion, said second indexing projection being positioned generally within said arcuate recess so that said first indexing projection is relatively movable within said arcuate recess during movement of said inner file portion between said open and closed positions.

5. A filing container in accordance with claim 1, including means for releasably locking said inner file portion in said closed position with respect to said outer support portion.

6. A filing container in accordance with claim 1, including stop means associated with said outer portion sidewalls opposite said outer portion front wall, said stop means being engageable by said inner file portion in the open position thereof for limiting opening pivotal movement of said inner file portion to an arc of less than 180 degrees.

7. A filing container in accordance with claim 6, wherein said end wall of said inner file portion is disposed at an angle with respect to the rear wall of the file portion equal to said arc of pivotal movement of said inner file portion, said means pivotally connecting said inner file portion and said outer support portion being positioned such that said end wall of said inner file portion is aligned and flush with respective ones of the edges of said outer portion sidewalls in the open position of said inner file portion, with said inner file portion extending beyond the respective opposite ones of the edges of said outer portion sidewalls.

8. A container for filing generally flat objects such as magnetic disks, comprising:

a generally rectangular outer support portion having a pair of laterally spaced sidewalls, and spaced front and rear walls extending between the respective opposite ends of said sidewalls, said rear wall including a stop portion;

an inner file portion disposed generally within said outer support portion and having an open-ended configuration for receiving said articles therein, said inner file portion including an end wall, a pair of laterally spaced sidewalls extending from said end wall, and spaced front and rear walls extending between said file portion sidewalls;

means pivotally connecting each of said inner file portion sidewalls to a respective one of said outer portion sidewalls, whereby said inner file portion is relatively pivotal about an axis with respect to said outer support portion through an arc of less than 180 degrees, said inner file portion being pivotal from a closed position wherein said inner file portion is substantially nested within said outer support portion, to an open position wherein said inner file portion is disposed in generally upstanding relation to said outer support portion in engagement with said stop portion for permitting access to the articles in said inner file portion;

said inner file portion including pivot means whereby said front wall thereof is pivotal toward and away from the rear wall thereof when said inner file portion is in said open position to facilitate access to said articles; and indexing means for preventing unrestrained relative pivotal movement of said inner file portion to said open position after said inner file portion has been relatively moved from said closed position.

9. A filing container in accordance with claim 8, wherein said indexing means comprises first and second coacting indexing projections, one of said projections being disposed on the inside surface of one of said outer portion sidewalls, the other of said projections being disposed on the outside surface of the one of said inner file portion sidewalls generally adjacent said one of said outer portion sidewalls, the one of said inner and outer portion sidewalls on which said second indexing projection is disposed defining an arcuate recess extending radially about said pivot axis of said inner file portion, said second indexing projection being disposed in said arcuate recess such that during relative pivotal movement of said inner file portion, said first indexing projection is relatively movable within said arcuate recess and said first and second projections are releasably engageable with each other for restraining movement of said inner file portion toward its open position after movement thereof from said closed position.

10. A filing container in accordance with claim 9, including cam means associated with one of said indexing projections engageable by the other one of said projections during relative pivotal movement of said inner file portion from said open to said closed position whereby movement of said inner file portion from said open to said closed position is relatively unrestrained by engagement of said first and second indexing projections with each other.

11. A filing container in accordance with claim 10, wherein said cam means comprises a cam surface positioned in said arcuate recess adjacent said second indexing projection, said cam surface being engageable by said first indexing projection during relative movement of said inner file portion from said open position to said closed position.

12. A filing container in accordance with claim 8, wherein
said end wall of said inner file portion is disposed at an angle with respect to the rear wall of the file portion equal to said arc of pivotal movement of said inner file portion,
said means pivotally connecting said inner file portion and said outer support portion being positioned such that said end wall of said inner file portion is aligned and flush with respective ones of the edges of said outer portion sidwalls in the open position of said inner file portion, with side inner file portion extending beyond the respective opposite ones of the edges of said outer portion sidewalls.

13. A filing container in accordance with claim 8, wherein
said outer support portion includes means projecting inwardly of said front wall thereof, said open end of said inner file portion being disposed in generally confronting relation to said inwardly projecting means when said file portion is in said closed position.

14. A filing container in accordance with claim 8, wherein
the inside surface of said end wall of said inner file portion defines a plurality of laterally extending ridges.

* * * * *